Patented June 6, 1944

2,350,360

UNITED STATES PATENT OFFICE 2,350,360

ESTERS OF SUBSTITUTED ACETIC ACIDS

Donald J. Loder, Wilmington, and Wilber O. Teeters, Roselle, Del., assignors to E. I. du Pont de Nemours & Company, Wilmington, Del., a corporation of Delaware No Drawing. Original application May 6, 1939, Serial No. 272,134. Divided and this application January 25, 1940, Serial No. 315,524

11 Claims. (Cl. 260—484)

The present invention relates to new materials and to methods for their preparation, and more particularly, to the polyhydric alcohol esters of alkoxy and alkoxy methylene substituted acetic acids and methods for their preparation. The application is a division of our copending application S. N. 272,134, filed May 6, 1939.

An object of the present invention is to provide new compositions of matter and processes for their preparation. A further object of the invention is to provide mono- and poly-ethylene glycol and mono- and di-glycerol and triglyceryl esters of substituted glycolic acids, together with processes for their preparation. Yet another object of the invention is to provide a process for the preparation of glycol mono- and di-glycolates and glycerol mono- and di-glycolates by esterifying substituted glycolic acid with glycols and glycerol, respectively. A further object of the invention is to provide a process for the preparation of glycol glycolates, glycerol glycolates, or a glyceryl glycolate which comprises reacting a glycolide with glycols or glycerol. Other objects and advantages of the invention will hereinafter appear.

These objects, as well as others which will be apparent as the description proceeds, may be accomplished by reacting a lower alkyl ester of any oxy-substituted acetic acid with a polyhydric alcohol under conditions favorable to the interchange of alcohol radicals. This interchange of alcohol radicals is effected by heating the alcohol and ester together, preferably in the presence of alkaline alcoholysis catalysts. The ester interchange proceeds more readily if the alcohol selected for reaction with the ester boils at a higher temperature than the alcohol liberated by the interchange, because the latter alcohol is then more readily removed from the zone of reaction, for example, by distillation.

The ester interchange process described above may be employed for the preparation of either the monoglycolates or the polyglycolates, for example, when it is desired to prepare ethylene glycol monoglycolate, in accord with the ester interchange process, equimolecular proportions of the ester and ethylene glycol are reacted. If, on the other hand, the reaction mixture contains two moles of the ester per mole of the ethylene glycol and the reaction continues to completion, the product will be ethylene glycol diglycolate. In like manner, if it is desired to obtain a glycerol mono- and di-glycolate or glyceryl triglycolate, one mole of glycerol is reacted with one, two, or three moles of an ester of glycolic acid. The process is applicable generally to the preparation of polyhydric alcohol, mono- and poly-glycolates, mono- and poly-alkoxy glycolates and mono- and poly-akoxy methoxy glycolates from the polyhydric alcohols and the lower alkyl esters of, respectively, glycolic acid, $CH_2(OH)COOH$, alkoxy acetic acids, $CH_2(OR)COOH$, such as methoxy acetic acid, $CH_2(OCH_3)COOH$, and alkoxy methoxy acetic acids, $CH_2(OCH_2OR)COOH$, such as methoxy methoxy acetic acid,

$$CH_2(OCH_2OCH_3)COOH$$

The methyl, ethyl, propyl, isopropyl, butyl, isobutyl, amyl, etc. esters of these acids, may be reacted with the polyhydric alcohols generally, such, for example, as: the glycols, e. g., ethylene glycol, propylene glycol, butylene glycol, amylene glycol, diethylene glycol, trimethylene glycol, octadecanediol, tetramethylene glycol, hexamethylene glycol, or the alcohols containing more than two hydroxyl groups, such as glycerol, diglycerol, triglycerol, trimethylol methane and trimethylol propane; sugars, such as, dextrose, sucrose, xylose, galactose, fructose, maltose, and mannose; and the sugar alcohols, such as, sorbitol, mannitol, and dulcitol; as well as castor oil (glyceryl tricinoleate), hydrogenated castor oil, (hydroxy stearin) and like long chain polyhydric alcohols.

This invention likewise includes esters of glycolic acid, alkoxy- and alkoxy methoxy-acetic acids with ether alcohols, i. e., polyhydric alcohols having at least one free hydroxyl group, one or more hydroxyl groups being etherified. Examples of such ether alcohols include the monoalkyl ethers of ethylene glycol, such as the monomethyl, -ethyl, -propyl or -butyl ethers of ethylene glycol, propylene glycol, etc. Esters of this class would be, e. g., ethylene glycol monomethyl ether glycolate, ethylene glycol monoethyl ether glycolate, ethylene glycol monomethyl ether methoxy acetate, $CH_2(OCH_3)COOCH_2CH_2OCH_3$ and ethylene glycol monomethyl ether methoxy methoxy acetate,

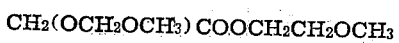

$$CH_2(OCH_2OCH_3)COOCH_2CH_2OCH_3$$

The mono- and di-glycolates of the monoglycerides are likewise included, e. g., the monoglycolates of the monoglycerides,

$$CH_2(OH)COOCH_2CHOH.CH_2OOCR$$

in which R is methyl, ethyl, propyl, butyl, etc. The monoglycerides of stearic acid, oleic acid, palmitic acid, etc., may be used for the preparation of these mono- and di-glycolates.

Polyhydric alcohol esters as well as ether alcohol esters of substituted glycolic acids may likewise be prepared by the aforesaid ester interchange process. For example, such esters of the following acids are also included in the present invention: the alkoxy acetic acids, $$CH_2(OR)COOH$$

e. g. ethoxy, propoxy, isobutoxy-acetic acids, etc.; the alkoxy alkoxy acetic acids, $$CH_2(OROR)COOH$$

e. g., ethoxy methoxy-, propoxy methoxy-, isobutoxy methoxy-acetic acids, etc.; and the alkoxy carbomethoxy methoxy acetic acids, $$CH_2(OCH_2OCH_2COOR)COOH$$

e. g., methoxy carbomethoxy methoxy acetic acid or ethoxy carbomethoxy methoxy acetic acid, which may be prepared by reacting glycolic acid formals with carbon monoxide in accord with the process described in U. S. Patent 2,250,487 of July 29, 1941, or in accord with the process of U. S. Patent 2,316,605 of April 13, 1943.

The esters of the present invention are preferably prepared by the above described ester interchange process, for the reason that this process provides a means of obtaining both the mono- and poly-glycolates in excellent purity and yield. Simple esterification may be employed, however, that is, by the interaction of the polyhydric alcohol with the glycolic acid. There appears to be one exception to this, in that, due to the dehydrating characteristics of glycolic acid, it does not react readily with glycerol but forms acrolein at the expense of the glycerol ester and, consequently, simple esterification should preferably not be employed when the glycerol esters of glycolic acid are desired.

The invention likewise provides another ester interchange process for the preparation of esters of glycolic acid. This process involves the interaction of a polyhydric alcohol or ether alcohol with glycolide, which may be considered to be a poly-ester of glycolic acid. This reaction may be effected by first forming the glycolide (prepared, e. g., in the usual manner by heating the glycolic acid to drive off all the water), and subsequently reacting the glycolide (which may be present as a diglycolide, or as a polyglycolide) with the polyhydric alcohol. If a partially dehydrated glycolic acid is used, e. g., a diglycolide or polyglycolide in the presence of free glycolic acid, the initial reaction is carried out under reflux and then water of esterification, of free glycolic acid and glycol removed with the aid of heat, either with or without a water carrier, such as, toluene. Ordinarily, this ester interchange may be conducted under atmospheric pressure, particularly with the higher boiling polyhydric alcohols, although if low boiling alcohols are employed, autogenous pressure or applied pressures of from 5 to 600 atmospheres may be employed.

The more detailed practice of the invention is illustrated by the following examples in which parts given are by weight unless otherwise stated. There are, of course, many forms of the invention other than these specific embodiments.

EXAMPLE I.—ETHYLENE GLYCOL MONOGLYCOLATE (A) To 2250 parts (25 moles) of methyl glycolate was added 1550 parts (25 moles) of ethylene glycol and, as catalyst, a solution of 3.0 grams of sodium in 7 grams of methanol (30% sodium methoxide solution). This mixture was refluxed under a fractionating column, fitted with a distilling head arranged for controlled reflux, until the head temperature had receded to 64–65° C. The methanol was removed as rapidly as possible at the head of the column, the head temperature being carefully maintained between 64° C. and 66° C. The refluxing and the collecting of the methanol were continued for approximately ten hours, at the end of which time approximately 800 grams (25 moles) of methanol had been collected.

The heat was discontinued and any low boiling material which remained was removed by vacuum distillation. (If desired the color of the product may be improved by treatment with 2 per cent. of its weight of a standard decolorizing charcoal. For most purposes, however, the color of the untreated ester was satisfactory).

(B) To 310 parts (5 moles) of ethylene glycol, contained in a suitable 3-necked flask equipped with an efficient stirrer and reflux condenser, was added 290 parts (5 moles) of powdered polyglycolide, prepared by completely dehydrating glycolic acid at elevated temperatures (100–220° C.). The temperature of the reaction mixture was raised to and held at a temperature of 100–200°, preferably between 190–200° C., for a period of approximately five hours.

In both (A) and (B) the reaction mixture was cooled, and the product obtained was a pale amber-colored liquid which contained 98 to 99 per cent. of glycol monoglycolate. The yield was substantially quantitative, based on either the glycol or glycolate; sp. gr. was 1.283 60° F./60° F. and the saponification number was 460.

EXAMPLE II.—ETHYLENE DIGLYCOLATE

The conditions and procedure are the same as Example I.

*Quantities*

Ethylene glycol_____ 930 parts, 15 moles
Methyl glycolate_____ 2700 parts, 30 moles
Anhydrous potassium carbonate
 (catalyst)_____ 10 parts
Methanol off_____ 960 parts, 30 moles

*Product*

Yield quantitative
Amber colored viscous liquid
Sp. gr. 1.327/20/4.
Sap. No. 611.

EXAMPLE III.—GLYCEROL MONOGLYCOLATE

The conditions and procedure are the same as Example I.

*Quantities*

Methyl glycolate_____ 1980 parts, 22 moles
Glycerol (96%)_____ 2108 parts, 22 moles
Anhydrous potassium carbonate
 (catalyst)_____ 10 parts
Methanol off_____ 704 parts, 22 moles

*Product*

Yield quantitative
Pale amber colored liquid.
Sp. gr. 1.320 60°/60° F.
Sap. No. 380.

EXAMPLE IV—GLYCEROL DIGLYCOLATE

The conditions and procedure are the same as for Example I.

*Quantities*

(A)

Glycerol monoglycolate
(in Example III) _____ 1950 parts, 13 moles
Methyl glycolate _____ 1170 parts, 13 moles
Anhydrous potassium carbonate
(catalyst) _____ 10 parts
Methanol off _____ 416 parts, 13 moles (B)

Glycerol (96%) _____ 1245 parts, 13 moles
Methyl glycolate _____ 2340 parts, 26 moles
Catalyst:
   1 g. Na in 5 g. of methanol
   Anhydrous potassium carbonate _____ 5 g.
Methanol off _____ 832 parts, 26 moles Products from (A) and (B) are identical in constants.

Yield substantially quantitative in both cases.
Amber colored viscous liquid.
Sp. gr. 1.393 20°/4°.
Sap. No. 542.

EXAMPLE V.—Beta-ethoxy Ethyl Glycolate

Up to and through the removal of methanol the conditions are the same as Example I.

*Quantities*

Methyl glycolate _____ 990 parts, 11 moles
Beta-ethoxy ethanol
  (Cellosolve) _____ 900 parts, 10 moles
Catalyst:
   1 part Na in 4 parts of methanol
   Anhydrous potassium carbonate ____ 5 parts
Methanol off _____ 309 parts, 9.7 moles The refluxing and the collecting of the methanol were continued until no more methanol was liberated. The reaction mixture was cooled and the calculated quantity of concentrated sulfuric acid added to form the neutral sulfate salt. The neutralized product was vacuum distilled and the beta-ethoxy ethyl glycolate distilled, giving 75 to 90% yield. It was found to be a mobile, colorless liquid having the following constants: B. P. 162–163° C./120 mm.; Sap. No.: theoretical 378; found 375.

EXAMPLE VI.—Beta-methoxy Ethyl Glycolate

To a mixture of 760 parts (10 moles) of crystalline glycolic acid and 760 parts (10 moles) of beta-methoxy ethanol was added 2 parts of concentrated sulfuric acid and 50 parts of benzene (water carrier). The reaction mixture was heated to reflux temperature and the water of esterification, which separated as a lower layer in a suitable decanting type distilling head, was removed. When the distillate no longer formed two layers the heat was discontinued and the crude ester cooled. The acid catalyst present in the crude mixture was exactly neutralized with anhydrous potassium carbonate and the beta-methoxy ethyl glycolate distilled and recovered in a yield of 70 to 80%. It was recovered as a mobile, colorless liquid having a B. P. of 155–156°/135 mm.; a sp. gr. of 1.163 60°/60° F. and a saponification number of 417.

EXAMPLE VII.—Octadecanediol Diglycolate

The procedure was the same as in Example I with the following exceptions: isobutanol, instead of methanol, was distilled off at the head of the column, at 105–110°; the reaction mixture was blanketed with nitrogen and a slow stream of this gas was continuously passed over the surface during the ester interchange; the pot temperature was held between 160–170° throughout the reaction; the product was filtered hot to give a quantitative yield of the ester.

*Quantities*

Octadecanediol _____ 429 parts, 1.5 moles
Isbutyl glycolate _____ 396 parts, 3.0 moles
Sodium methoxide (30%) (catalyst) ____ 6 parts

*Product*

White low melting solid
Sap. No. theoretical 194; found 184.

EXAMPLE VIII.—Castor Oil Glycolate

Procedure the same as for octadecanediol diglycolate, Example VII.

*Quantities*

Castor oil _____ 888 parts, 1 mole
Isobutyl glycolate _____ 396 parts, 3 moles
Sodium methoxide
  (catalyst) _____ 3.0 parts of 30% in methanol

*Product*

Yield substantially quantitative.
Amber reddish viscous liquid.
Sap. No. 242.

EXAMPLE IX.—Ethylene Glycol Monomethoxy Acetate

Procedure the same as Example I (glycol monoglycolate) with the exception that, after the reaction mixture was cooled, the alkaline catalyst was exactly neutralized with sulfuric acid and the product distilled under reduced pressure.

*Quantities*

Methyl methoxy acetate ____ 260 parts, 2.5 moles
Ethylene glycol _____ 155 parts, 2.5 moles
Sodium methoxide (catalyst)
  (30% in methanol) _____ 2 parts

*Product*

Yield substantially quantitative.
Colorless liquid.
B. P. 141–142° C./25 mm.
Sp. gr. 1.174 60°/60° F.
Sap. No. 420.

EXAMPLE X.—Ethylene Bis-methoxy Acetate

Procedure same as for Example IX.

*Quantities*

Methyl methoxy acetate ____ 520 parts, 5.0 moles
Ethylene glycol _____ 155 parts, 2.5 moles
Sodium methoxide (catalyst)
  (30% in methanol) _____ 2 parts

*Product*

Yield substantially quantitative.
Colorless liquid.
B. P. 176–77° C./25 mm.
Sp. gr. 1.194 60°/60° F.
Sap. No. 555.

In place of the sodium methoxide of the examples, other alcoholysis catalysts may be used such as sodium ethoxide, sodium glyceroxide, and alkali metal alkoxides generally; sodium hydroxide, anhydrous potassium carbonate, calcium oxide, litharge, etc.; or mixtures of the two types. Alkaline alcoholysis catalysts are, in general, more satisfactory, though in some instances, acid alcoholysis catalysts, e. g., sulfuric, p. toluene sulphonic acid, and hydrochloric acids, may be employed.

The polyhydric alcohol esters and ether-esters of glycolic acid, as well as the other esters described herein, have many characteristics which particularly fit them for uses in the arts. They are all generally useful as solvents, or plasticizers for many natural and synthetic resins which are used with or without pigments, fillers, extenders and the like, which compositions are employed for the preparation of lacquers, pigments, paste pigments, etc., or for the formation of films, filaments, rods, tubes, or shaped articles. More specifically, they are generally useful as solvents, plasticizers and softeners for natural resins, such, for example, as Damar, Copal, Kuri and for the synthetic resins such, for example, as the alkyds; cumarone-indene; chlorinated diphenyl; soluble types of polymerized hydrocarbons, phenol-formaldehyde and urea-formaldehyde resins; ester gum; polymeric acrylic and methacrylic acids and their esters, amides, nitriles, imides, salts, interpolymers, and other derivatives; polyvinyl alcohol; the polyvinyl esters; styrene and other polymeric resins, as well as simple mixtures of the natural and/or synthetic resins, and/or interpolymers of the polymeric resins. The polyhydroxy alcohol esters of glycolic acid are also useful as solvents, plasticizers or softeners of regenerated cellulose and the cellulose derivatives, such as, cellulose acetate, nitrate, aceto-nitrate, aceto-propionate, methyl cellulose, ethyl cellulose and other organic derivatives of cellulose or mixtures thereof.

The polyhydric alcohol esters of glycolic acid are likewise generally applicable as the major ingredients in the preparation of printing pads and ink feeders of all types, as penetrating agents for printing pastes, and as major ingredients in the preparation of inks, both for the printing of paper, textiles, wood, metal or other materials.

The ethylene glycol monoglycolate, diglycolate and glycerol mono-, di- and tri-glycolate, may be used as softeners for glassine paper, as a substitute for glycerine in tobacco, as a softener for regenerated cellulose and as a substitute for glycerol in printing ink compositions. They have likewise been found acceptable for the sizing of the artificial and natural silks and particularly for the sizing of regenerated cellulose filaments and fabrics and are also most effective as softening agents for cotton, wool, linen, jute, rayon and silk.

Glycolate esters of the alkyl ethers of polyhydric alcohols such, for example, as glycolic acid esters of the monoalkyl ethers of ethylene glycol, $HOCH_2COOCH_2CH_2OR$, are, as has been generally stated above, excellent solvents for cellulose ethers and cellulose esters. These compositions are especially valuable in brush-type lacquers and lacquers applied hot, as they improve the flow and gloss properties of the resulting films. The ether-esters have been found acceptable as frothing agents for the flotation of ores and as solvents for the absorption of acidic gases such as the sulfur oxides, hydrogen sulfides, etc. Furthermore, they, together with the other polyhydric alcohol esters of glycolic acid, are excellent solvents and liquid media for certain dyestuffs and pigments wherein they may be substituted for the ethers of the polyhydric alcohols.

The polyhydric alcohol esters and ether-esters of glycolic acids, hereinbefore described, may also be used as ingredients in the preparation of compounds for defrosting and anti-misting; in cosmetic preparations; as dye solvents for basic acid and direct dyes; as the fluid medium of electrolytic condensers; as ingredients in leather finishes and varnish removers; as solvents and fixatives for perfumes; as softeners for cork binders, glue, gelatin, paper and textile sizes; as an ingredient in dentifrice compositions; as softeners for casein, zein, soybean, protein plastics, etc.; as an ingredient in leakproofing compositions for gas distributing systems, gas masks and the like; in the preparation of wetting, dispersing and penetrating agents, etc., such as sulfates and the like; as precipitation inhibitors; and as ingredients in fluids for hydraulically actuated mechanisms.

The phosphate derivatives of the polyhydric alcohol glycolates are likewise useful as plasticizers generally for use in combination with the aforementioned natural and synthetic resins, as well as the cellulose ethers, esters, and regenerated forms of cellulose.

The esters of the alkoxy acetic acids, in addition to the uses above described for the glycolic esters of the alkyl ethers of the polyhydric alcohols and because of their large number of active solvent groups, are particularly excellent solvents for gases, liquids, solids and resins. The excellent solvent properties of materials of this type can be attributed to the combination of ether and ester groupings.

All glycolate esters disclosed can be reacted with an aliphatic or aromatic anhydride or acid to give relatively water insoluble esters that are good plasticizer-softeners. As an example the glycerol glycolates reacted with acetic anhydride will give the triacetates of the three glycolates of glycerol.

From a consideration of the above specification it will be realized that many changes may be made in the details therein given without departing from the scope of the invention or sacrificing any of the advantages that may be derived therefrom.

We claim:

1. A process which comprises alcoholysis of an ester of a substituted acetic acid, having the formula $CH_2(OCH_2Y)COOH$, in which Y is selected from the group consisting of hydrogen and alkoxy groups, with a compound selected from the group consisting of polyhydric alcohols and alkyl ethers thereof, the compound of the group boiling higher than the alcohol whose radical forms a part of the ester.

2. A process which comprises alcoholysis of a substituted acetic acid ester of a lower aliphatic alcohol having the formula $CH_2(OCH_2Y)COOX$, in which Y is selected from the group consisting of hydrogen and alkoxy groups, and X is an alkyl group, with an alcohol selected from the group consisting of polyhydric alcohols and alkyl ethers thereof, the compound of the group boiling higher than the alcohol whose radical forms a part of the ester.

3. A process which comprises the alcoholysis of an alkoxy acetate, $CH_2(OR)COOR$ in which R is an alkyl group in each instance, with a polyhydric alcohol to form a polyhydric alcohol ester of the alkoxy acetic acid.

4. A process which comprises the alcoholysis of an alkoxy acetate, $CH_2(OR)COOR$ in which R is an alkyl group in each instance, with ethylene glycol, to form an ethylene glycol ester of the alkoxy acetic acid.

5. A process which comprises the alcoholysis of an alkyl alkoxy acetate with a polyhydric alcohol.

6. A process which comprises the alcoholysis of methyl methoxy acetate, $CH_2(OCH_3)COOCH_3$, with ethylene glycol to form an ethylene glycol methoxy acetate.

7. A process which comprises the preparation of ethylene glycol monoalkoxy acetate, $$CH_2(OR)COOCH_2CH_2OH$$

in which R is an alkyl group, which comprises interacting a mixture containing substantially equimolar proportions of ethylene glycol and an alkyl alkoxy acetate, whereby the alkyl group is replaced by the ethylene glycol group.

8. A process which comprises the preparation of an ethylene dialkoxy acetate $$CH_2OOC(OR)CH_2$$
$$CH_2OOC(OR)CH_2$$

in which R's are alkyl groups, which comprises the alcoholysis of a mixture containing substantially two moles of an alkyl alkoxy acetate and one mole of ethylene glycol.

9. Ethylene glycol monomethoxy acetate, $$HOCH_2CH_2OOC(CH_3O)CH_2$$

10. A methoxy acetic acid ester of a polyhydric alcohol.

11. A mono (methoxy-substituted acetic acid) ester of a polyhydric alcohol.

DONALD J. LODER.
WILBER O. TEETERS.